March 26, 1968     W. OSTBERG ET AL     3,375,042
CARGO SUPPORTING FLOOR FOR BULK CARGO CONTAINERS
Filed Oct. 17, 1966     3 Sheets-Sheet 1
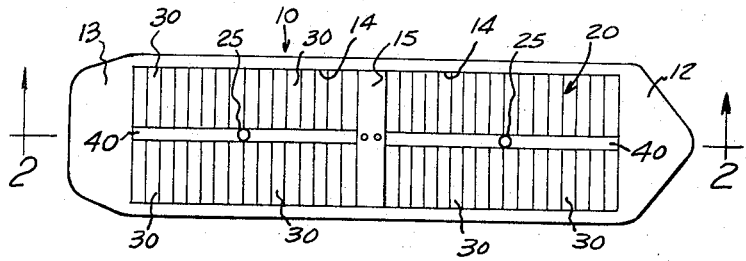
FIG. 1
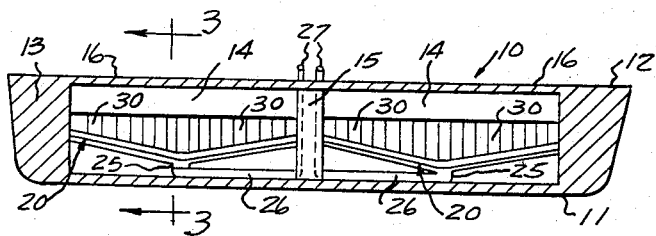
FIG. 2
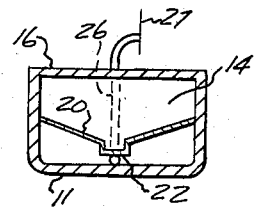
FIG. 3
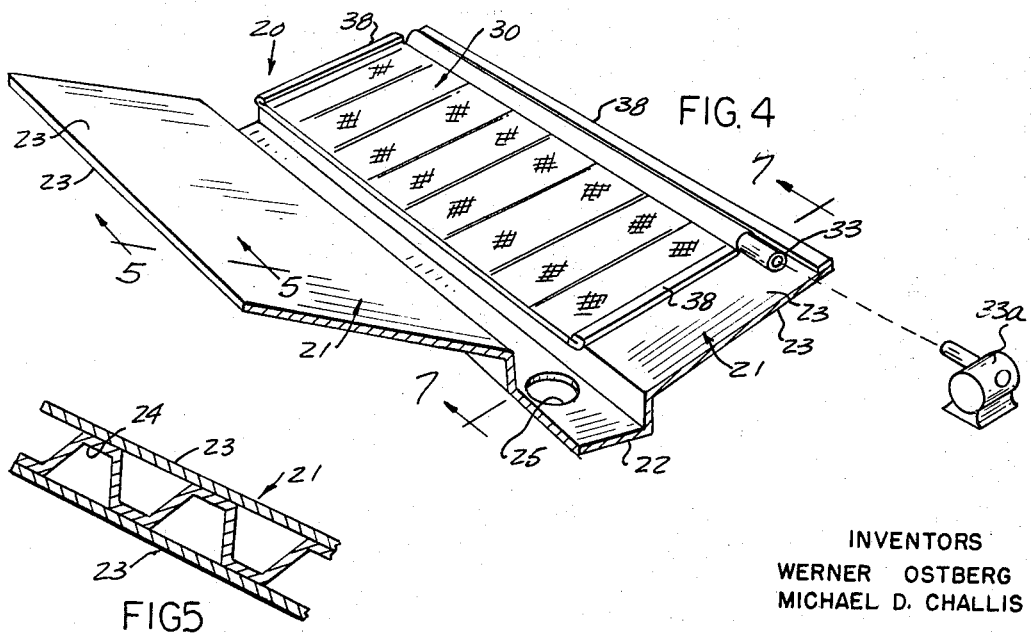
FIG. 4
FIG. 5
INVENTORS
WERNER OSTBERG
MICHAEL D. CHALLIS
BY Pullen, Sloman, & Cantor
ATTORNEYS March 26, 1968    W. OSTBERG ETAL    3,375,042
CARGO SUPPORTING FLOOR FOR BULK CARGO CONTAINERS
Filed Oct. 17, 1966    3 Sheets-Sheet 2
FIG. 6
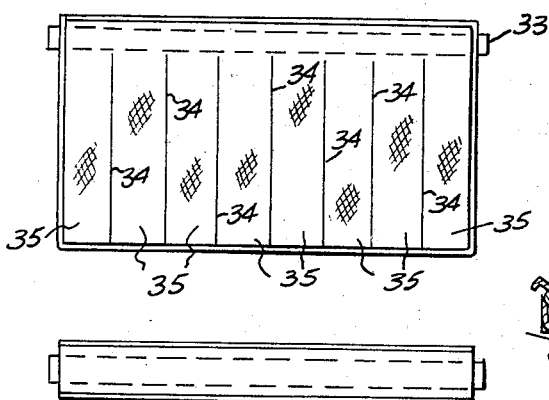
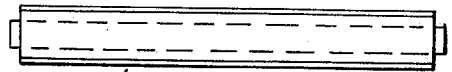
FIG. 8
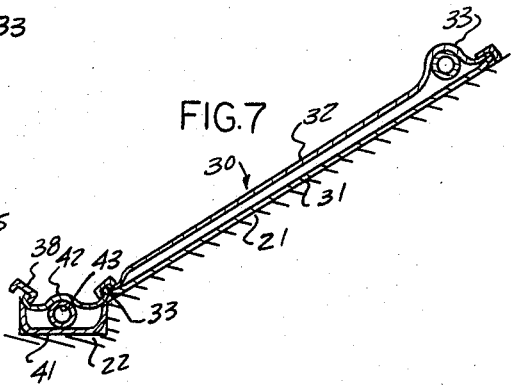
FIG. 7
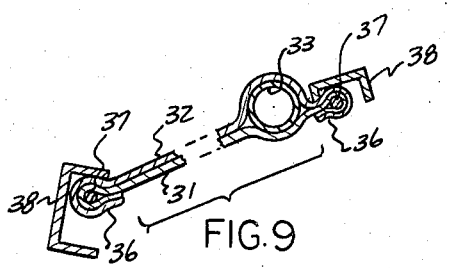
FIG. 9
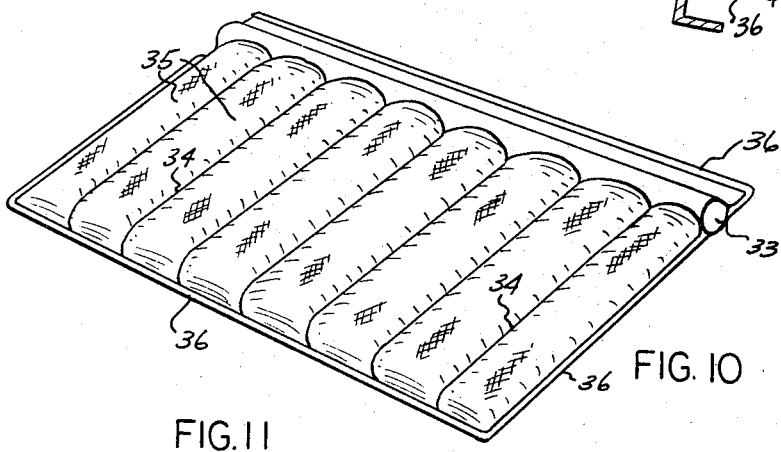
FIG. 10
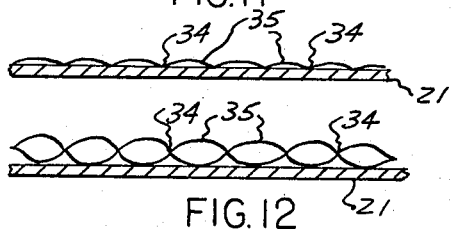
FIG. 11
FIG. 12
INVENTORS
WERNER OSTBERG
MICHAEL D. CHALLIS
BY Cullen, Sloman, & Cantor
ATTORNEYS

INVENTORS
WERNER OSTBERG
MICHAEL D. CHALLIS

BY *Cullen, Sloman, & Cantor*
ATTORNEYS

United States Patent Office 3,375,042
Patented Mar. 26, 1968

3,375,042
CARGO SUPPORTING FLOOR FOR BULK CARGO CONTAINERS
Werner Ostberg, Milan, and Michael D. Challis, Ann Arbor, Mich., assignors to Dundee Cement Company, Dundee, Mich.
Filed Oct. 17, 1966, Ser. No. 587,158
1 Claim. (Cl. 302—29)

ABSTRACT OF THE DISCLOSURE

In a system for pumping dry material out of a cargo hold, using a sloping floor and an air pad or envelope, the provision of an air pipe parallel to the upper and higher edge of the pad to billow it for final material delivery.

---

This invention relates to a cargo supporting floor for bulk cargo containers, and more particularly, to an air permeable support for dry, bulk, particulate material which simultaneously functions as a means for conveying air to such material for fluidizing the material for conveyance.

Dry, bulk particulate material, such as cement powder, is characterized by fluidizing when mixed with a pressurized gas, such as air, wherein such material may be easily conveyed as if it were a fluid material. Hence, it is desirable to provide a means in containers for transporting such materials to a discharge point or points, and to convey air or the like gas into such container in such a way as to fluidize the material so that it may be conveniently discharged from the container by gravity, suction or blown under pressure.

In the construction of large transportation containers, such as river barges, railroad cars, trucks and the like, it is extremely difficult to economically provide a suitable support floor which, at the same time, can be made so as to be an air distributor for fluidizing the bulk cargo for unloading such container. This is particularly true in large river barges where the gross weight of cargo may run as high as 1,500 tons or more and thus, requires substantial support floors within the barges and with such large quantity of material plus the substantial support floor required, it has been in the past impractical, particularly from an economical point of view, to provide a suitable support floor which also can function as a means for distributing air for fluidizing the cargo for unloading.

Moreover, in the past, emptying such containers, particularly when the containers were almost at the empty point, has been done manually because of the difficulty of fluidizing and moving and gathering small quantities of particulate materials spread over the large floor of the container.

Hence, it is an object of this invention is provide a cargo supporting floor particularly useful in large containers such as large river barges, railroad cars, trucks, large storage silos and the like, which floor is structurally strong enough to support heavy, bulk cargo, and which includes means to evenly distribute compressed air beneath the cargo for fluidizing the cargo material and conveying it to a point or points where the bulk material may be removed by gravity, suction, or blowing or other means from the bottom of the container, and wherein such means functions to remove virtually all of the material automatically, without the need for manual cleaning or hand operations of any sort.

Another object of this invention is to provide a cargo supporting floor formed in two parts, namely, a solid, rigid base floor covered with an air distribution means in the form of a normally flattened envelope through which compressed air may easily permeate upwardly into the bottom of the bulk material, with the envelope being so formed as to inflate when the cargo above it is almost removed, to thereby channel, sweep and remove virtually all of the bulk materials stored upon it.

Still another object of this invention is to provide a support floor construction for a river barge used for carrying dry, bulk, particulate material which floor includes a base support, covered by an air permeable envelope construction, with the floor and the envelope being formed to first fluidize the material from the bottom towards the top and secondly, to channel the material into a central collection opening at the bottom of the barge from which the material may be removed from the barge for thereby rapidly emptying the barge and eliminating the need for hand operated blowers and other emptying mechanisms.

These and other objects and advantages of this invention will become apparent upon reading the following description of which the attached drawings form a part.

In these drawings:

FIG. 1 is a top, plan view of a barge with the upper hatches or covers removed.

FIG. 2 is a schematic, cross-sectional view taken in the direction of arrows 2—2 of FIG. 1, and FIG. 3 is a cross-sectional view taken in the direction of arrows 3—3 of FIG. 2.

FIG. 4 is a perspective view of a portion of the support floor.

FIG. 5 is a fragmentary view taken in the direction of arrows 5—5 of FIG. 4, and showing to an enlarged scale, a portion of the support floor construction.

FIG. 6 is a plan view of a single envelope.

FIG. 7 is a cross-sectional view, to an enlarged scale, taken in the direction of arrows 7—7 of FIG. 4.

FIG. 8 is a plan view of an envelope formed to fit within the floor trough.

FIG. 9 is an enlarged, fragmentary, cross-sectional view of a portion of an envelope.

FIG. 10 is a perspective view showing an envelope inflated.

FIG. 11 is a schematic cross-sectional view of an envelope in its deflated position, and FIG. 12 is a view similar to FIG. 11 but with the envelope inflated.

Figure 13:
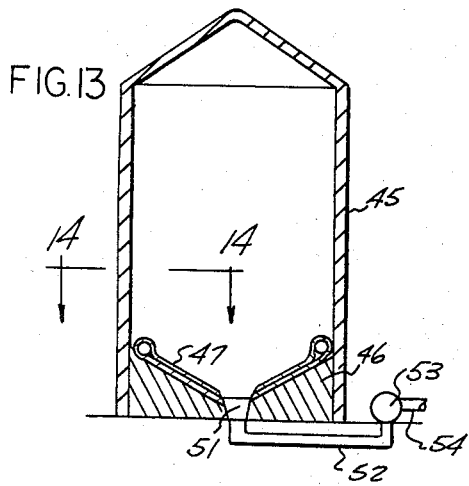
FIG. 13 is a schematic, cross-sectional, elevational view of a storage silo.

Schematically illustrated in FIGS. 1, 2, and 3, is a large cargo carrying barge 10 having a bottom 11, bow 12 and stern 13, with dry cargo holds 14 separated by a central, large, hollow bulkhead 15. Normally, the holds would be covered with suitable deck covers or hatches 16 (shown in FIGS. 2 and 3 schematically). The number of holds may be varied as may be required for the volume of material carried.

The invention herein relates to the load supporting floor built into each of the cargo carrying holds 14. Such load supporting floor 20, is formed of a V-shaped base floor 21 (see FIG. 4) having a central, flattened trough at its apex. Preferably, the floor is made of flat, sheet metal plates 23 between which is fastened central corrugated plates 24. The plates thus form a composite decking or support floor with the various plates fastened together as by welding or the like, as conventional.

A central opening or well 25 is formed in the trough of the floor in each of the holds. Secured below such opening is a suction pipe 26 which extends upwardly through the bulkhead 15 to a flanged connection end 27.

Each of the troughs are inclined, fore and aft to form a central low point at the openings or wells 25. Thus, the floor 21, in effect, forms a large funnel which slopes downwardly from the sides of the barge toward the center and then downwardly fore and aft toward the center of each hold.

Covering the floor 21 is a series of large, flattened envelopes 30. For example, FIG. 1 illustrates four of such envelopes in each of the two holds 14. As illustrated in FIGS. 6, 7 and 9, each envelope comprises a lower sheet 31 which is made of an air impermeable material and which rests upon the base floor 21, and an upper sheet 32 which is made of an air permeable material. Preferably, the upper sheet is made of a tough synthetic fabric of a relatively tight weave to resist abrasion and support loads, while at the same time permitting a uniform flow of air through the pores of the fabric, that is, around its threads.

A perforated pipe 33 is arranged within and along the upper edge of each envelope. The pipes are connected to an air compressor 33a of any conventional sort which may be located beneath the floor 21 or else located on shore and connected with a suitable pipeline. The upper and lower sheets of each envelope are further fastened together intermediate their opposite edges by means of lines of stitches 34 or the like, which extend from the lower edges of the envelope to the perforated pipe 33 to divide the envelope into a number of sections 35, each communicating with the perforated pipe 33.

The envelope edges are provided with edge beads 36 which may be made in any conventional sewing manner, such as by sewing cords 37 along the edges of the envelope to thus make a thickened edge bead.

The various envelopes are laid end to end to completely cover and overlie the base floor 21 and are secured thereto along their edges. Any suitable mechanical fastening may be used for this purpose, such as metal channel strips 38 which overlap the beaded edges of the envelopes and which may be fastened to the metal floor 21 by means of screws or the like. Thus, the envelopes, which are quite large, are firmly anchored in place and prevented from shifting under the impact of cargo loading or unloading, or movement of the barge.

The barge illustrated in FIG. 1 schematically represents the largest conventional river barges in use, which are of a 1,500 ton capacity and it can be seen that only eight envelopes are required to cover completely the two barge holds. Thus, each of the envelopes may be roughly 20 feet in length by approximately 15 feet in width, although its dimensions are by no means critical.

The large envelopes previously described, do not cover the trough portion 22 and instead separate, long, narrow envelopes 40 are used for that purpose, with each hold having two such envelopes. As shown in FIGS. 7 and 8, such envelopes each comprise an air impermeable sheet 41 which rests against the bottom of the trough and an upper air permeable sheet 42, with the two sheets secured together at their edges with suitable edge beading so as to be anchored by anchor strips 38. Between the upper and lower sheets is arranged a perforated pipe 43, also connected to air compressor 33a, for carrying air therebetween.

*Operation*

In operation, the barge is first loaded, from above, with its dry bulk cargo, which may be in the form of powdered cement or other similar dry, particulate material. Once the holds are filled, the covers or hatches are applied and the barge transported to its unloading destination.

At that point, the air compressors 33a blow compressed air into the envelopes 30. For purposes of unloading such a barge, the air pressure used is relatively low as is the quantity of air flowed through the envelopes. For example, in unloading a cement barge containing 1,500 tons of cement, an air pressure of less than 6 p.s.i., and possibly down to only slightly above 0 p.s.i., with a flow of air in the range of about 4 c.f.m. per square foot of aeration area is adequate for most purposes. The air enters into the flattened envelopes which remain substantially flattened, and permeate upwardly through the air permeable upper sheets of all of the envelopes 30 as well as the trough envelopes 30 as well as the trough envelopes 40 to thus mix with the bottom of the cargo and fluidize it so that it flows easily down and through the unloading opening or well 25. For such purposes, a suitable vacuum operating pump, connected to a pipe which extends to shore and is coupled to flanged connection end 27, sucks the now fluidized cargo through the unloading pipe 26. The shore extending pipe conveys the cargo to unloading or storage silos or the like. Thus, the cargo is discharged by suction and it is progressively fluidized from bottom towards the top as its level gravity drops until the barge is fairly close to empty.

As the weight of the cargo reduces, the envelopes begin to inflate until, when the cargo is almost completely empty, the envelopes are completely inflated as shown in FIGS. 10 and 12. When inflated the sections 35, located between the stitching lines 34 billow outwardly and the areas at the stitchings form troughs or drain channels which convey and direct the remnants of the cargo downwardly into the trough 22 where the fluidized material is further directed by the air permeating through the trough envelope towards the well 25. Thus, the billowing or inflation of the envelopes serves to break up any coagulations or lumps in the bulk material at the same time sweep or channel the material towards the bottom opening with the result that all of the material may be removed without manual sweeping or cleaning.

The bulk material could alternatively be discharged from the barge by a suitable pump or blower (not shown) located beneath well 25 for flowing the material out through pipe 26.

With such a construction, an average rate of 150 tons per hour or more of dry particulate material, such as cement, may be removed from a barge per hour so as to unload the barge completely within two work shifts of eight hours each, without the need for large amounts of manual labor to sweep out the holds and clean out the remnants of the cargo.

Further, it can be seen that the support floor functions to first adequately support the load and secondly, because of its composite construction (including the envelope) serves as a distributor for circulating compressed air evenly beneath the cargo for fluidizing the cargo and at the same time directing it towards its discharge point.

While the foregoing description and drawings illustrate a large cargo carrying river barge, it can be seen that the invention herein may be easily adapted for other types of shipping containers such as railroad bulk carrying cars, trucks, and large storage silos and the like wherein the same problem of unloading large quantities of dry, bulk particulate material exists.

Figure 14:
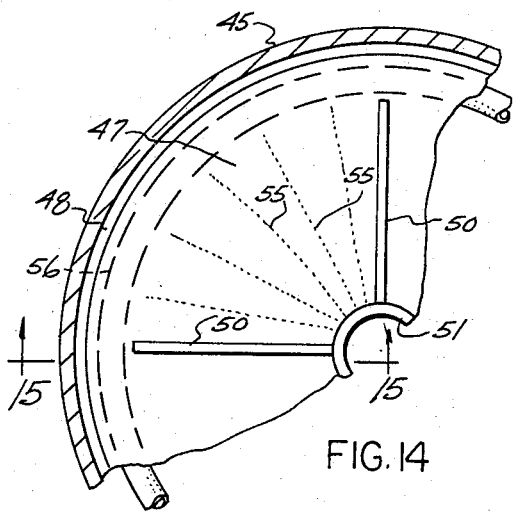
FIG. 14 is an enlarged, fragmentary view taken in the direction of arrows 14—14 of FIG. 13.
Figure 15:
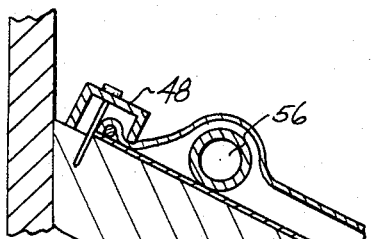
FIG. 15 is an enlarged, fragmentary view taken as if in the direction of arrows 15—15 of FIG. 14.

Thus, referring to FIGS. 13, 14 and 15, a circular silo 45 is shown with a funnel-like, rigid floor 46 covered by envelopes 47 which are formed as segments of a circle. The envelopes are secured to the floor by means of channel strips 48, 49 and 50 which are fastened to the floor by bolts or screws or the like.

An opening or well 51, formed in the center of the floor, communicates with pipe 52, which forms the discharge point. This, in turn, is connected to a vacuum pump 53 and an outlet pipe 54 for unloading the silo. Alternatively, a blower pump or a mechanical unloader could be used for unloading. The envelopes are each provided with lines of stitching 55 and an outer peripheral, perforated pipe 56 connected to a conventional blower (not shown).

Except for the modified shape (i.e. circular) of the envelopes and floors, the structure and operation are substantially as described above.

Figure 16:
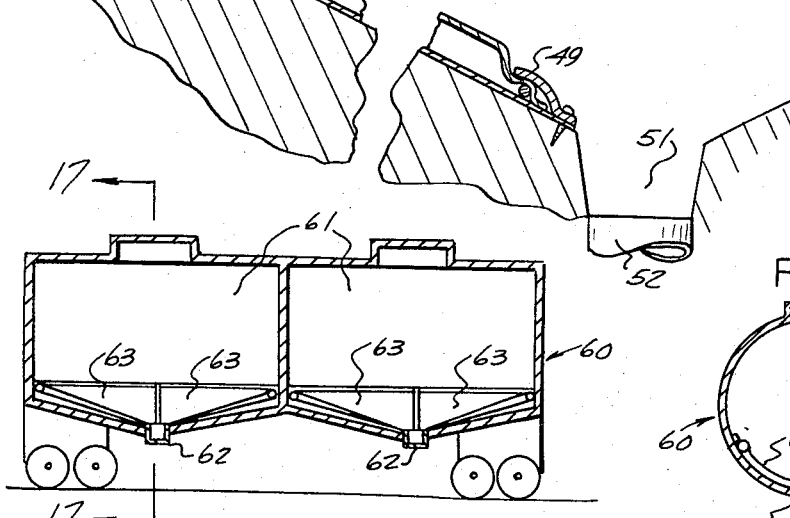
FIG. 16 is a schematic, cross-sectional, elevational view of a railroad, bulk carrier car.
Figure 17:
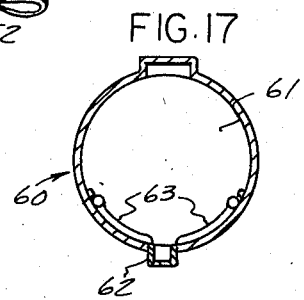
FIG. 17 is a schematic, cross-sectional view of the interior of the car, taken as if in the direction of arrows 17—17 of FIG. 16.

FIGS. 16 and 17 schematically illustrate a typical railroad, bulk carrier car 60 having two holds 61 which are circular in cross-section, and with the hold floors being funnel-like in shape for removal of the cargo through openings 62.

The envelopes 63, thus are identical to those described above; the construction, thus differing only in that the rigid support floor is curved instead of flat as in a barge.

This invention may be further developed within the scope of the following claim. Accordingly, it is desired that the foregoing description be read as being merely illustrative of an operative embodiment of this invention and not in a strictly limited sense.

Having described and disclosed an operative embodiment of this invention, we now claim:

1. A bulk cargo container used for containing dry, bulk, particulate material and having a bottom and upstanding enclosing side walls, said bottom having hereon a super floor comprising a lower rigid section extending from side wall to side wall and an upper, non-rigid envelope section resting on the rigid section;

the latter being sloped downwardly from the side walls towards the center of the floor to form a funnel-like construction, with its upper surface being substantially unobstructed; the center of the rigid section being formed as a trough for containing a suction pipe for sucking out the material in said trough after it slides down into said trough from the sloping parts of the rigid section;

said non-rigid section being formed of at least two flat envelopes, one on each side of the center trough, each having a lower, air impermeable, flat sheet overlying and covering the upper surface of one half of the rigid section, and an upper, air permeable sheet having its peripheral edges secured to the peripheral edges of said lower sheet;

said sheets of each envelope being further secured together along spaced apart transverse lines running from their high wall-adjacent peripheral edges towards their lowest center-floor points, to thus form each envelope of a number of separate envelope sections, and means for delivering air into the envelopes including two perforated pipes, each extending through all of the sections of its envelope for uniformly delivering air to all sections of each envelope;

whereby said sections will billow out between said lines when the weight of the cargo becomes sufficiently reduced during removal of the cargo from the container so that the areas at said lines form valleys running downwardly towards the lower center trough for directing flow of the cargo material towards the center trough;

with the means for delivering compressed air into each of said envelopes being a pipe extending along the outer and higher edge of said envelope in a direction parallel to the center trough to thereby cause such air to uniformly permeate through the upper sheet and into the bulk cargo supported upon the floor, to thereby fluidize the cargo material and permit removal of the same at the low point of the floor, with the entering air progressively billowing the envelope in waves parallel to the center trough starting from its outer edge.

References Cited
UNITED STATES PATENTS

| | | | |
|---|---|---|---|
| 2,196,781 | 4/1940 | Saino et al. | 52—618 |
| 2,805,897 | 9/1957 | Yellott | 302—29 |
| 2,943,891 | 7/1960 | Paton | 302—29 |
| 3,061,379 | 10/1962 | Lusted | 302—29 |
| 3,231,312 | 1/1966 | Paton | 302—29 |

ANDRES H. NEILSEN, *Primary Examiner.*